No. 11,814. Reissued Mar. 27, 1900.

R. FORWOOD.

CAR FENDER.

(Application filed Feb. 17, 1900.)

Witnesses
O. G. Hupmann
E. H. Bates

Inventor
Reginald Forwood.
By Attorney Herbert W. Jenner.

THE NORRIS PETERS CO., PHOTO-LITHO., WASHINGTON, D. C.

UNITED STATES PATENT OFFICE.

REGINALD FORWOOD, OF PARIS, TEXAS.

CAR-FENDER.

SPECIFICATION forming part of Reissued Letters Patent No. 11,814, dated March 27, 1900.

Original No. 631,933, dated August 29, 1899. Application for reissue filed February 17, 1900. Serial No. 5,570.

*To all whom it may concern:*

Be it known that I, REGINALD FORWOOD, a citizen of the United States, residing at Paris, in the county of Lamar and State of Texas, have invented new and useful Improvements in Car-Fenders, of which the following is a specification.

This invention relates to improvements in that class of devices known as "car-fenders;" and it has for its object to provide a fender which may be manufactured at a comparatively-small expense and may be readily attached to and removed from a car without altering the construction of the car in any manner whatever.

The invention also contemplates a construction which will not seriously bruise or injure a person struck thereby and will absolutely prevent such person from falling beneath the car, the construction being such that any one coming in the path of the fender will be gently moved to one side of the car and ouside of the track-rails, so as not to be struck by the passing car.

The invention will be fully understood from the following description and claims when taken in conjunction with the annexed drawings, in which—

Figure 1:
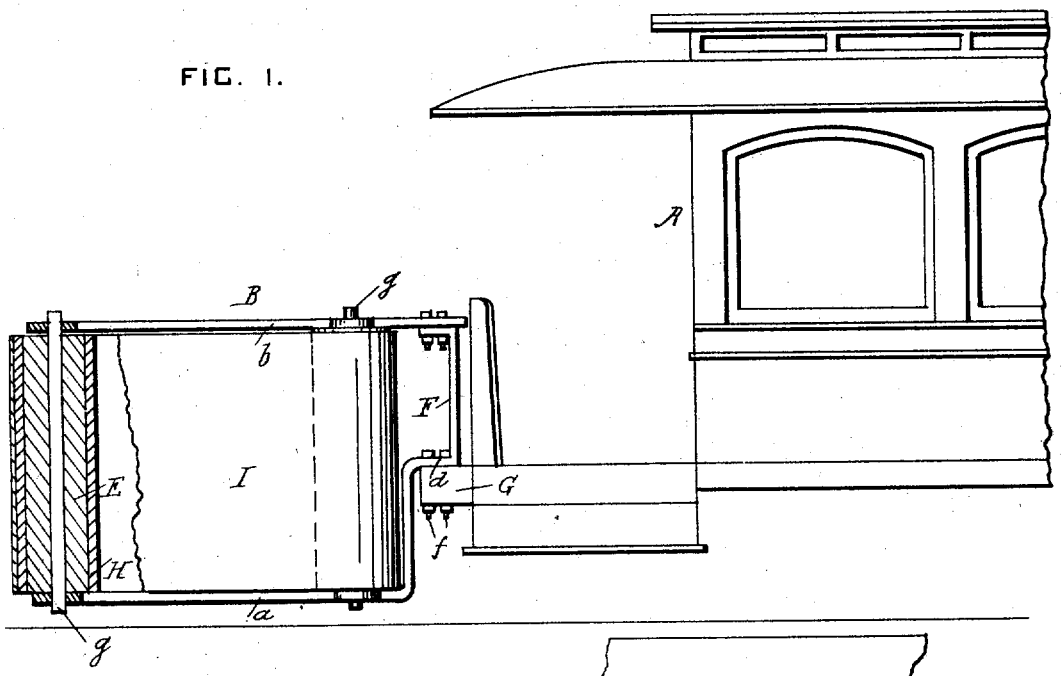
Figure 2:
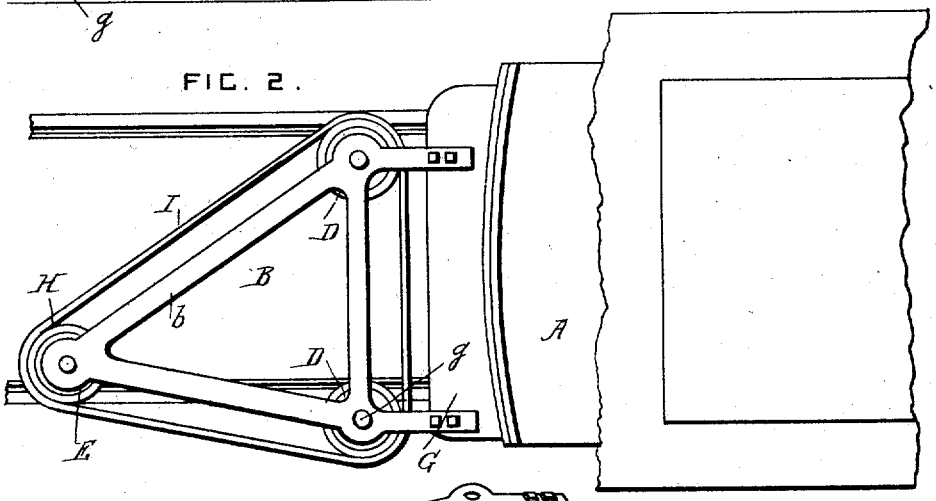
Figure 3:
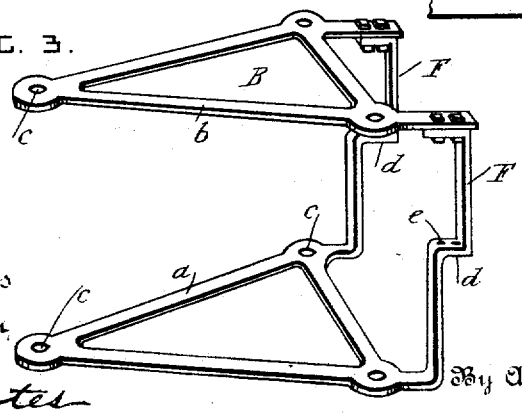

Figure 1 is a side view of a part of a car, showing my approvements applied with one of the rollers in vertical section and the belt or band broken. Fig. 2 is a plan view of the same, there being no parts in section; and Fig. 3 is a perspective view of the supporting-frame with the rollers removed.

Referring by letter to said drawings, A indicates a part of a car which is shown for the purpose of illustrating my improvements applied, and B indicates my improved fender. This fender comprises three vertically-disposed rollers which are sustained in a frame attached to the platform end timber of a car or other suitable part thereof. The frame which I prefer to employ for this purpose is of a skeleton form and comprises a lower horizontal section *a* and an upper similar section *b*, both of which are of substantially-triangular form in outline, having journal-apertures *c* at the angles, which are designed to receive the journal ends of the rollers D and E. These sections of the frame, which are disposed horizontally, bringing the journal-apertures vertically, are also disposed parallel and are connected by means of vertical cross-bars F. These cross-bars are here shown as comprising integral parts of the lower section of the frame; but it is obvious that they may be composed of separate pieces and secured to said section in any suitable manner, as by bolts and nuts. I have also shown these vertical cross-bars as having a bend or shoulder *d* at a suitable elevation for the purpose of resting upon the platform end timber G of the car, and these shoulder portions have holes *e* to receive bolts, as *f*, which also take through holes in the timber G to fix the frame, and consequently the parts carried thereby, to the front of the car. The upper ends of the bars F may be turned at an angle, as shown, and provided with holes to receive securing-bolts taking through corresponding holes in the inner ends of the upper frame-section. This frame may be constructed from steel or other suitable material, and the manner of attaching the same to a car may be varied according to the fancy of the manufacturer. The rollers which I prefer to employ should be constructed of some light material and their surfaces covered with a cushion H, of rubber or the like, so that a person coming in contact therewith may not be seriously injured or badly bruised, and such rollers are provided with journals *g* at each end to take into the apertures *c* in the frame B.

It will be seen that I have a roller adjacent to the car and disposed vertically above each track-rail, and a third roller E is arranged in advance of the first-named rollers and above one rail only, so that said rollers when viewed in plan form a triangle, and these rollers are connected by an endless band I, which is also vertically disposed and covers the peripheries of the rollers. This band may be composed of canvas or other strong material having sufficient elasticity to give to the impact and yet when striking an object will impart a rotative movement to the rollers over which it is drawn. By this means it will be seen that should an object be in the path of the car or between the rails of the track when struck by the fender motion will be imparted to the belt or band, which will cast off the object and move the same out of the plane of movement of the car without injury.

When the car and its fender are in motion bodily upon the track and are being propelled thereover in any approved manner, the rollers and the endless band passing around them are relatively stationary and no rotary motion is imparted to the rollers. As the said rollers of the band conveyer have no driving connections they are at all times free to revolve whenever the diagonally-arranged and foremost stretch of the band strikes against an object on the track. When an object is struck by the endless band, the said band and rollers are set in motion relatively to each other at a speed proportional to the force of the blow or impact, and the band therefore moves the object laterally off the track with a force proportional to the speed of the car and the force of the blow.

In the present illustration I have shown the fender as extending to nearly the height of the dash of the car; but in practice the height may be varied as may be found most desirable. The lower ends of the rollers and the belt or band taking over the same should extend sufficiently close to the road-bed or rails to prevent an object from getting beneath.

One great advantage claimed for this fender and which accounts for its one-sided appearance is that it will throw a person to one side of the road or street, and in case of double tracks the advantage is more clear, as there would be very little chance of a person getting between the tracks. The majority of accidents arise from people attempting to cross the track in front of an approaching car, and the fender is designed to throw a person away from either track.

Having thus described my invention, what I claim is—

1. The combination of a car arranged to travel on a track, and a fender comprising a frame connected with the car, upright rollers mounted in said frame at the opposite sides of the track; one of the said rollers being arranged in advance of the other, and an endless band of flexible material passed around the rollers and having its forward stretch disposed diagonally to and extending the full width of the track, substantially as specified.

2. The combination of a car arranged to travel on a track, and a fender comprising a frame connected with the car, an upright roller mounted in said frame at one side of the track, upright rollers mounted in the frame and arranged one in advance of the other at the opposite side of the track; the foremost of the latter rollers being also arranged in advance of the first-named roller, and an endless band of flexible material passed around the rollers and having its forward stretch disposed diagonally to and extending the full width of the track, substantially as specified.

3. The frame comprising the upper and lower sections having alined apertures which in plan are disposed in a triangle; in combination with the rollers having their ends journaled in said apertures and covered with a cushion, and a belt or band connecting the rollers so as to impart a rotative movement thereto, substantially as specified.

4. In a car-fender, the combination, with a supporting-frame, of rollers journaled in the said frame, one of the said rollers being arranged out of line with and in advance of the other, and an endless conveyer-band carried by the said rollers with its foremost stretch arranged diagonally, said rollers and band being relatively stationary when the car is in motion and being set in motion relatively at a speed proportional to the force of the blow when the band strikes an object, substantially as set forth.

5. In a car-fender, the combination, with a supporting-frame, of a band-conveyer carried by the said frame and having its foremost stretch arranged diagonally, said conveyer being free to move in proportion to the force of the blow with which it strikes an object, substantially as set forth.

In testimony whereof I have hereunto set my hand in presence of two subscribing witnesses.

REGINALD FORWOOD.

Witnesses:
HERMANN S. GEE,
WM. H. BEDELL.